(12) United States Patent
Urbonas et al.

(10) Patent No.: US 11,016,314 B2
(45) Date of Patent: May 25, 2021

(54) NON-VOLATILELY PROGRAMMABLE OPTICAL DEVICES AND METHODS TO CONFIGURE SUCH OPTICAL DEVICES

(71) Applicant: International Business Machines Corporation, Armonk, NY (US)

(72) Inventors: Darius Urbonas, Adliswil (CH); Rainer F. Mahrt, Maennedorf (CH); Thilo H. C. Stoeferle, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 16/103,351

(22) Filed: Aug. 14, 2018

(65) Prior Publication Data

US 2020/0057318 A1 Feb. 20, 2020

(51) Int. Cl.
*G02F 1/01* (2006.01)
*G02F 1/17* (2019.01)

(52) U.S. Cl.
CPC ............ *G02F 1/0126* (2013.01); *G02F 1/17* (2013.01); *G02F 2201/346* (2013.01)

(58) Field of Classification Search
CPC ..... G02F 1/0126; G02F 1/17; G02F 2201/346
See application file for complete search history.

(56) References Cited

U.S. PATENT DOCUMENTS

| 7,580,596 | B1 | 8/2009 | Meijer et al. | |
| 8,483,521 | B2 | 7/2013 | Popovic | |
| 9,086,584 | B2 | 7/2015 | Preble et al. | |
| 9,735,543 | B2 | 8/2017 | Reece | |
| 2002/0131464 | A1* | 9/2002 | Sirbu | B82Y 20/00 372/45.01 |
| 2005/0047465 | A1* | 3/2005 | Grosse | B82Y 20/00 372/50.1 |

(Continued)

OTHER PUBLICATIONS

Wang, X., et al., "Proposal of a Grating-Based Optical Reflection Switch using Phase Change Materials", Optics Express, Revised Aug. 2009, Accepted Aug. 31, 2009, pp. 16947-16956, vol. 17, Issue 19.

(Continued)

*Primary Examiner* — Joseph P Martinez
*Assistant Examiner* — Vipin Patel
(74) *Attorney, Agent, or Firm* — Scully, Scott, Murphy & Presser, P.C.; Daniel P. Morris (57) ABSTRACT

A method to configure an optical device. The method may rely on an optical device that includes two parallel mirrors extending, each, parallel to a reference plane, and an active material extending between the mirrors. An average plane of the active material is parallel to said reference plane, so as to form an optical resonator. The active material is energized so as to non-volatilely alter a refractive index and/or an optical absorption in one or more regions of said material. This results in forming one or more cavities, respectively, in which light can be laterally confined, in-plane with said average plane, in addition to being confined between the mirrors, along a direction perpendicular to said reference plane. Each of the one or more cavities has an altered mode profile compared to a non-altered region of the active material. Related methods and optical devices are also disclosed.

20 Claims, 6 Drawing Sheets

(56) References Cited

U.S. PATENT DOCUMENTS

| | | | |
|---|---|---|---|
| 2008/0186492 A1* | 8/2008 | Kiesel | G01N 21/39 356/433 |
| 2008/0186503 A1* | 8/2008 | Kiesel | G01N 21/031 356/454 |
| 2014/0319708 A1* | 10/2014 | Thind | B29D 11/00355 264/1.36 |
| 2016/0139311 A1 | 5/2016 | Ding et al. | |

OTHER PUBLICATIONS

Pernice, W.H.P., et al., "Photonic non-volatile memories using phase change materials", Applied Physics Letters, Accepted Aug. 7, 2012, published online Oct. 22, 2012, pp. 171101-1-171101-4.

Rios, C., et al., "On-Chip Photonic Memory Elements Employing Phase-Change Materials", Advanced Materials, Mar. 5, 2014, pp. 1372-1377, vol. 26, Issue 9.

Michel, A.-K. U., et al., "Using Low-Loss Phase-Change Materials for Mid-Infrared Antenna Resonance Tuning", Nano Letters 2013, Published Jun. 6, 2013, pp. 3470-3475, vol. 13.

Wang, Q., et al., "Optically reconfigure metasurfaces and photonic devices based on phase change materials", https://pdfs.semanticscholar.org/c4ac/0d450a843de8139679633e7491efa17aacef.pdf, Accessed on Aug. 14, 2018, pp. 1-13.

Chen, Y., et al., "Engineering the Phase Front of Light with Phase-Change Material Based Planar lenses", Scientific Reports, Accepted Jan. 28, 2015, Published Mar. 2, 2015, pp. 1-7, 5:8660.

Dung, D., et al., "Variable potentials for thermalized light and coupled condensates", Nature Photonics, Sep. 2017, pp. 565-572, vol. 11.

Kim, S.Y., et al., "Complex Refractive Indices of GeSbTe-Alloy Thin Films: Effect of Nitrogen Doping and Wavelength Dependence", Jpn. J. Appl. Phys., Nov. 18, 1998, accepted Dec. 15, 1998, Mar. 1999, pp. 1713-1714, vol. 38, Part 1, No. 3B.

\* cited by examiner

NON-VOLATILELY PROGRAMMABLE OPTICAL DEVICES AND METHODS TO CONFIGURE SUCH OPTICAL DEVICES

The project leading to this application has received funding from the European Union's Horizon 2020 research and innovation program under grant agreement No. 642656.

BACKGROUND

The present disclosure relates in general to the field of optical devices, optical resonators, optical (micro) cavities, and methods of configuring and operating such devices.

Optical microcavities are known to confine light to a small volume. Devices using optical microcavities are today essential in many fields, ranging from optoelectronics to quantum information. Typical applications are long-distance data transmission over optical fibers, optical sensing and read/write laser beams in DVD/CD players. A variety of confining semiconductor microstructures have been developed and studied, involving various geometrical and resonant properties. A microcavity (MC) has smaller dimensions than a conventional optical cavity; it is often only a few micrometers thick and the individual layers that it comprises can even reach the nanometer range. Such dimensions notably allow for studying and exploiting quantum effects of electromagnetic fields.

More in details, an optical cavity or a MC forms an optical resonator, which allows, in case of a Fabry-Pérot geometry, for a standing wave to form inside the central layer between the two mirrors. The thickness of the latter determines the cavity mode, which corresponds to the wavelength that can be transmitted and forms as a standing wave inside the resonator. An ideal cavity would confine light indefinitely (without loss) and would have resonant frequencies at defined values. The deviations from this ideal behavior are captured by the cavity (Q) factor, which is proportional to the confinement time in units of the optical period. Another important descriptive parameter is the effective mode volume (V), which relates to the number of optical modes present in the cavity. In general, the realization of practical devices requires maximizing the ratio Q/V, i.e., high values for Q and low values for V are important to increase light-matter interactions in processes such as spontaneous emission, nonlinear optical processes and strong coupling.

An optical resonator comprises a vertically layered stack of different materials and/or structures on a substrate that realizes two mirrors to confine the light in the vertical direction. Lateral confinement of the light is usually achieved by locally modulating the refractive index or optical absorption of the mirrors or the volume between them. This can be achieved in a non-volatile way using lithographic definition and processing (the resonator properties are then permanently fixed and not reconfigurable). Another way is to use a liquid between the mirrors, which liquid contains a material that can change its optical properties (e.g., liquid crystals or thermo/electro-active polymers). This gives rise to a configurable (or programmable), yet volatile resonator, in which power need be maintained to maintain a desired state of this material.

SUMMARY

According to a first aspect, the present invention is embodied as a method to configure an optical device. The method relies on an optical device that includes two parallel mirrors extending, each, parallel to a reference plane, and an active material extending between the mirrors, so as to form an optical resonator. The average plane of the active material is parallel to said reference plane. The active (solid state) material is energized so as to non-volatilely alter a refractive index and/or an optical absorption in one or more regions of said material. This results in forming one or more cavities, respectively, in which light can be laterally confined, in-plane with said average plane, in addition to being confined between the mirrors, along a direction perpendicular to said reference plane. Each of the one or more cavities has an altered mode profile compared to a non-altered region of the active material.

According to another but related aspect, the invention is embodied as an optical apparatus. The apparatus comprises an optical device such as described above, i.e., with two parallel mirrors extending, each, parallel to a reference plane, and an active material extending between the mirrors, whereby an average plane of the active material is parallel to said reference plane, so as to form an optical resonator. The apparatus further comprises a light emitting device. The active material is assumed to have been configured (e.g., using a method such as described above) in such a manner that a refractive index and/or an optical absorption is non-volatilely altered in one or more regions of the active material, so as to form one or more cavities, respectively. Again, such cavities are such that light can be laterally confined therein, not only between the mirrors (along a direction perpendicular to said reference plane), but also in-plane with said average plane. As a result, each of said cavities has an altered mode profile compared to a non-altered region of the active material. Finally, the light-emitting device is configured to couple light into the resonator, so as to confine light in each of said cavities: on the one hand, between the mirrors and perpendicularly to said reference plane; and, on the other hand, laterally, in-plane with said average plane.

Methods and apparatuses embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Technical features depicted in the drawings are not necessarily to scale: some of the features shown have been purposely exaggerated, for the sake of depiction (especially the defects shown in FIGS. 2B and 6). Similar or functionally similar elements in the figures have been allocated the same numeral references, unless otherwise indicated.

DETAILED DESCRIPTION OF EMBODIMENTS OF THE INVENTION

As said in the background section, optical resonators have been proposed, which can either be volatilely or permanently configured. As present Inventors concluded, it would be desired to have an optical resonator element with nonvolatile but programmable (and thus reconfigurable) optical properties, the later including, e.g., frequencies, positions, profiles and quality factors of the resonant modes. This led them to design novel optical resonators and configuration methods as described in the description, which is structured as follows. First, general embodiments and high-level variants are described (sect. 1). The next section addresses more specific embodiments and technical implementation details (sect. 2).

1. General Embodiments and High-Level Variants

In reference to FIGS. 1-9, an aspect of the invention is first described, which concerns a method to configure an optical device 1, 1a-1e.

Figure 9:
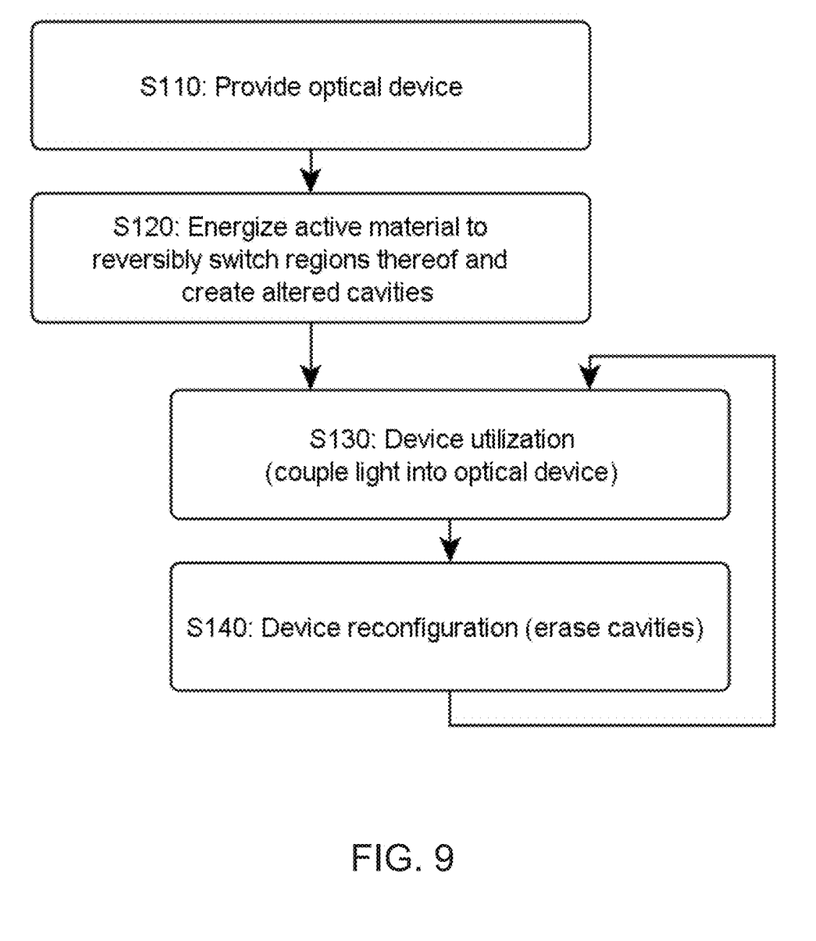
FIG. 9 is a flowchart illustrating high-level steps of a method of configuring and operating an optical device, according to embodiments.

High-level steps ("S1XX") of such a method are aggregated in the flowchart of FIG. 9. Basically, this method involves S110 an optical device 1, 1a-1e, such as depicted in FIGS. 1-7.

The optical device generally has a plane extension. It includes two parallel mirrors 12, 16 (or reflectors) extending, each, parallel to a reference plane (x, y). The device further includes an active (solid state) material 14, which can be regarded as an optical spacer that extends between the mirrors 12, 16. The spacer 14 is a confinement layer, wherein an electromagnetic wave can be substantially confined between the mirror 12, 16. Each layer of the stack 12-16 has a planar extension: the average plane of the active material 14 is parallel to said reference plane (x, y). As a whole, the layer stack 12-16 forms an optical resonator.

In addition, the device in some embodiments comprises a substrate 11, be it to provide mechanical resistance to the device. As assumed in the appended drawings, one 12 of the mirrors 12, 16 can be formed on top of the substrate 11. In variants, the substrate may itself be structured (e.g., as a layer stack) to play the role of one of the mirrors.

Figure 1:
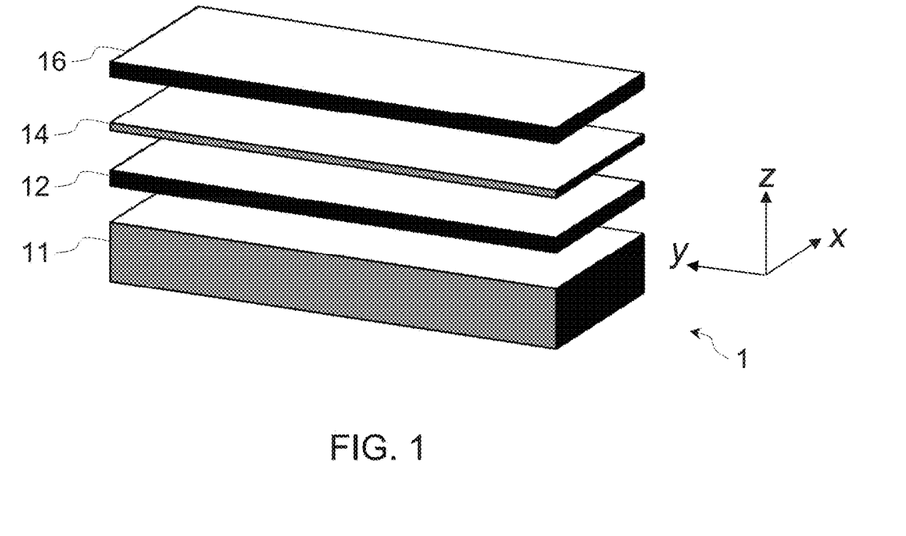
FIG. 1 is a 3-dimensional (exploded) view of the layer stack of an optical device, as involved in embodiments.
Figure 2A:
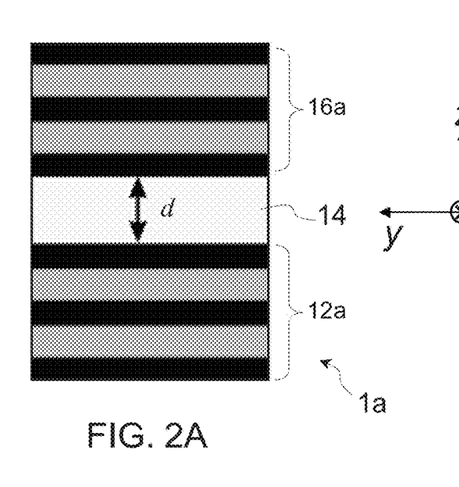
FIGS. 2A and 2B show 2-dimensional cross-sectional (partial) views of optical devices, as involved in distinct embodiments. In both cases, the mirrors are embodied as distributed Bragg reflectors (DBRs). While usual DBRs are assumed in FIG. 2A, the DBRs of FIG. 2B purposely form a defect formed by a lithographically pre-defined cavity.
Figure 2B:
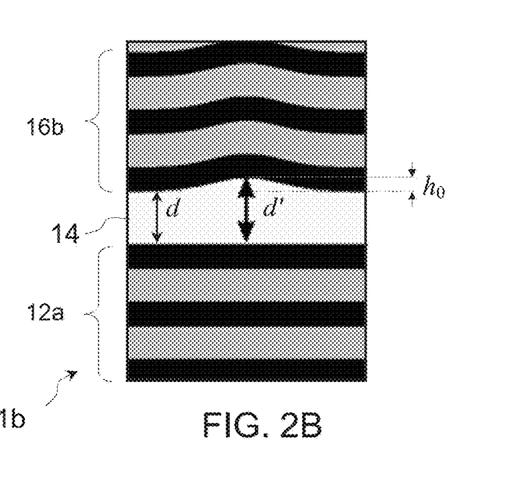

The two mirrors 12, 16 may for instance be formed as distributed Bragg reflectors (DBR) 12a, 16a, 16b, as assumed in FIGS. 2A, 2B, hence forming an optical cavity with the active material 14 in-between. The DBRs may notably be formed from multiple layers of alternating materials with varying refractive index, as assumed in FIG. 2 (each layer boundary causes a partial reflection of an optical wave). In variants, the DBRs may be formed by periodic variation of some dimensional characteristics of a dielectric waveguide, resulting in periodic variation in the effective refractive index. In all cases, the layer stack 12-16 behaves (in its initial, non-altered state) a standard (planar) Fabry-Pérot-like cavity. That is, the cavity resonance wavelengths are defined by the effective mirror distance d and the refractive index n. The resonances show angular dispersion, i.e., the resonance wavelength changes with reflection/transmission angle $\alpha$. Furthermore, the initial cavity is delocalized (in-plane), meaning that the mode profile of this cavity is the same everywhere across the plane extension of the resonator.

The active material 14 is selected so as to enable the creation of specific cavities (e.g., microcavities) therein, in which the refractive index and/or the optical absorption (or optical extinction) of the energized material 14 is altered compared to other (i.e., non-altered) regions of the material layer 14. That is, the active material 14 can be energized S120 so as to non-volatilely alter the refractive index and/or the optical absorption in given regions 145 of the material 14. Cavities 145 are thereby formed, which respectively correspond to the energized regions of the material 14. At least one cavity is formed S120 in the layer 14, though embodiments of the present methods and device may involve the creation of several cavities 145.

Interestingly, as per the lateral confinement the cavities enable, light can be laterally confined in each of said cavities, i.e., in-plane with said average plane of the layer 14, which is parallel to the plane (x, y), owing to the alteration of refractive index (and/or optical absorption). In addition, and owing to the vertical layer stack, light can further be confined between the mirrors 12, 16, i.e., along the direction z perpendicular to said reference plane (x, y). As per the geometry achieved, each cavity 145 has an altered mode profile in a plane section perpendicular to said reference plane (x, y), compared to non-altered regions of the active material 14.

"Energizing" the active material means that an energy pulse is applied to energize this material 14, in the form of light or heat, for example. I.e., such alterations can notably be achieved using an optical laser beam or electrical resistive means, to create short energy pulses in the form of light (which is then converted into heat) or heat, respectively. The applied pulse has a finite temporal profile. Yet, the alterations obtained after having energized the active material 14 are non-volatile. That is, such alterations persist even after completion of the application of the pulse: power does not need to be maintained for such alterations to persist, owing to the material 14 chosen, as discussed later in detail. Still, such alterations are in some embodiments reversible: a reversibly switchable material may possibly be used.

As a result of such alterations, light (e.g., a standing optical wave) can be laterally confined in the resulting cavities 145, in-plane with the average plane of the active material 14, in addition to being vertically confined between the mirrors 12, 16, along the direction perpendicular to said reference plane (x, y).

The above scheme allows the lateral confinement of light and therefore the mode profile of the resonator to be dynamically changed, throughout the plane (x, y). That is, the mode profile of a cavity 145 is changed compared to non-altered regions of the resonator, whereby the cross-section of the optical mode is altered, in a plane perpendicular to said reference plane (x, y).

Thanks to the present approach, properties such as frequencies, positions, profiles and quality factors of the resonant modes of the optical resonator can be easily configured and possibly re-configured. The present optical devices can therefore be non-volatilely programmed. In this way, reconfigurable, complex resonator arrangements (e.g., arrays, chains, etc.) become feasible for the benefit of several applications, such as applications to vertical-cavity surface-emitting laser (VCSELs), spectrometers, mode filters. In embodiments, also the coupling strength between adjacent cavities 145 can be tuned, as discussed later.

On the contrary, prior art techniques rely on geometries that employ in-plane light guiding, i.e., parallel to a substrate, using waveguide structures of high-refractive index material, where some part is tunable in its refractive index. Therefore, the propagation direction of the light is always parallel to the surface in such prior resonators. And unlike some embodiments disclosed in the present disclosure, the cross-section of the mode profile is fixed in such prior art devices, given by the single-mode optical guiding condition of the waveguide. I.e., in such prior art devices, the cross-section of the mode profile does not change across the plane extension of the device, even if the refractive index is changed in some part of the waveguide (which only changes the resonance frequency of the resonator, not the mode profile inside the waveguide).

On the contrary, in some embodiments disclosed in the present disclosure, light can be confined perpendicularly to the reference plane (x, y) without requiring any waveguiding, while lateral confinement can be dynamically changed (and therefore the mode profile of the resonator can be changed too), by inducing local, non-volatile changes of the optical properties of the material 14. Although, in principle, alteration in both or each of the refractive index n and optical absorption coefficient (i.e., the optical extinction coefficient k) of the active material 14 may be sought, it is in some embodiments sufficient to seek to primarily alter the refractive index of the material 14, as in applications contemplated herein.

In some aspects, the resonance frequency of ring resonators can be modified in a non-volatile way. The present disclosure in embodiments opens up new possibilities, inasmuch as it makes it possible to not only modify the resonance frequency but also to non-volatilely (i.e., persistently, even without maintain power) program the lateral mode profile of the resonator across the plane extension of the resonator. To achieve this, the present disclosure discloses the two mirrors 12, 16 in a vertical configuration, e.g., parallel to the plane extension of the resonator (and in some embodiments parallel to the supporting substrate, if any), which, in turns, makes it possible to select and shape the desired lateral mode profile, by way of local alteration in the layer 14.

Writing and erasing the cavities can for instance be done in parallel, e.g., using suitable spatial profiles for the heating beam, or sequentially, e.g. by modulating the power of a heating beam swept over the device. Once configured (or -reconfigured), the present devices 1, 1a-1e can be used (or re-used) for multiple applications, ranging from usual optical applications as listed above (VCSELs, spectrometers, mode filters) to more advanced applications such as quantum cryptography or quantum computation. For example, the altered cross-section of the optical mode makes it possible to perform photonic quantum simulations, using an array of optically coupled cavities as obtained in embodiments.

Figure 3A:
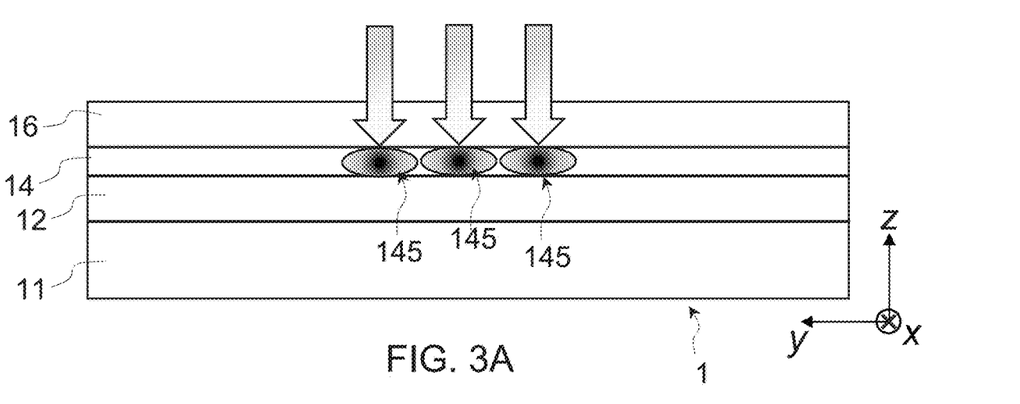
FIG. 3A is a 2-dimensional cross-sectional view of a device such as depicted in FIG. 1, which further illustrates how the active material of the resonator can be non-volatilely altered to form cavities with altered mode profiles, according to embodiments.
Figure 3B:
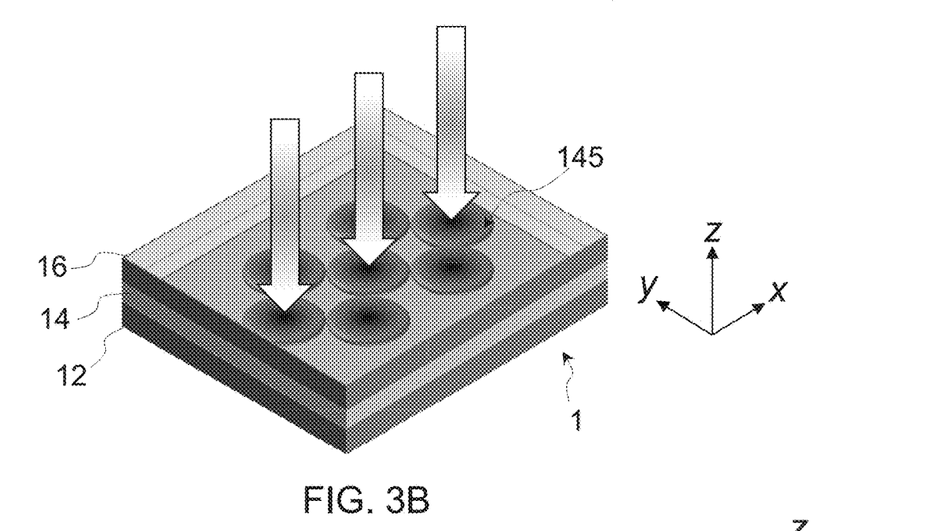
FIG. 3B is a corresponding 3-dimensional view, showing a possible 2-dimensional arrangement of the resulting cavities, as in embodiments.
Figure 3C:
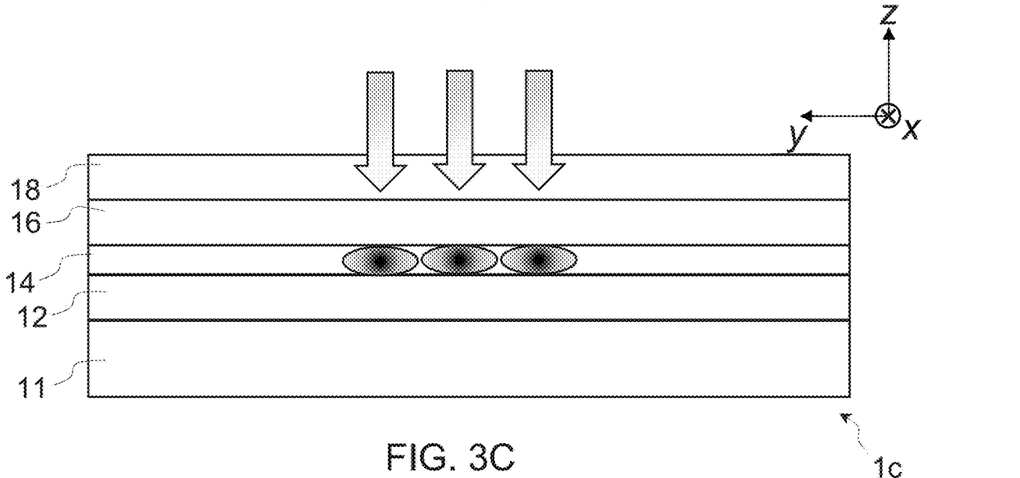
FIG. 3C is a 2-dimensional cross-sectional view of a device according to a variant of FIGS. 1 and 3A, wherein the device additionally comprises an absorber layer, which is energized so as to form the desired cavities in the active material, as in embodiments.
Figure 5:
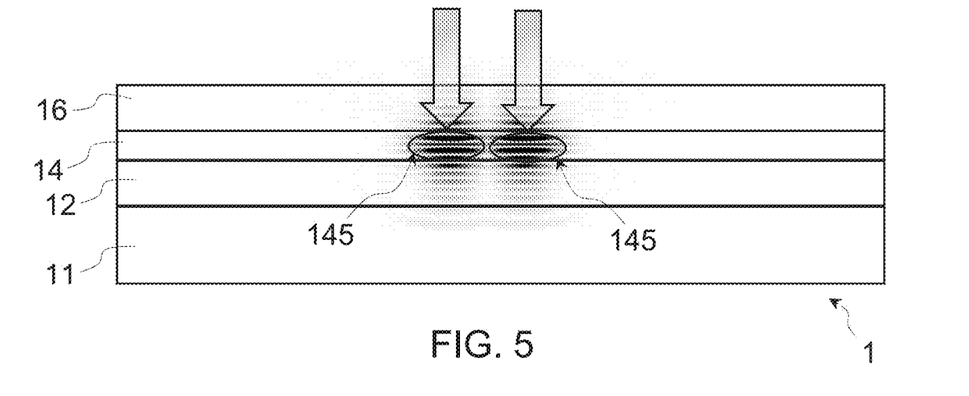
FIG. 5 is a 2-dimensional cross-sectional view of a device similar to that of FIG. 3A, wherein two neighboring, optically coupled cavities are created in the active material, as in embodiments.
Figure 6:
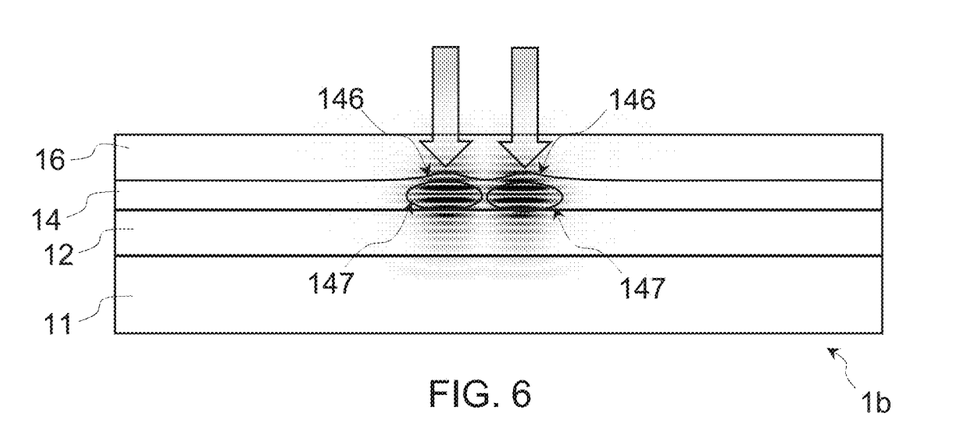
FIG. 6 is a 2-dimensional cross-sectional view of a device, wherein the target cavities are formed at the level of pre-defined cavities, which form defects such as shown in FIG. 2B, as involved in embodiments.
Figure 7:
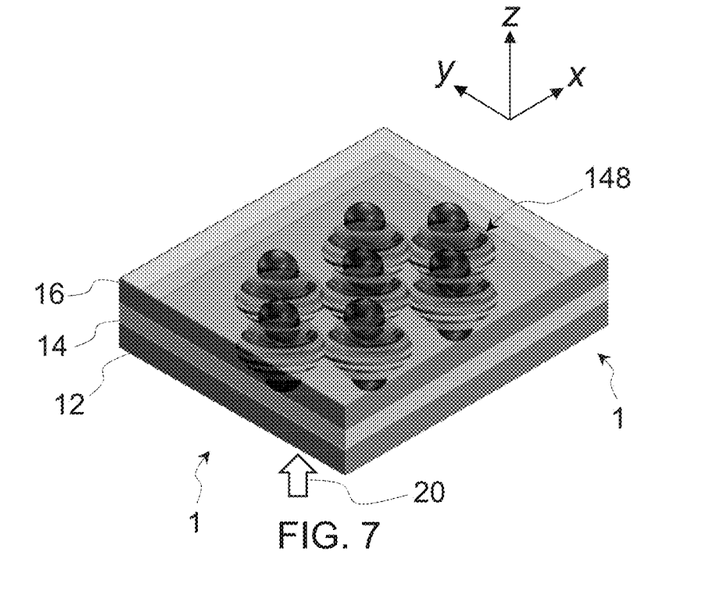
FIG. 7 is a 3-dimensional view of a device such as shown in FIG. 1 or 3B, illustrating how light coupled into the resonator of the device can be confined in cavities thereof, both in-plane and perpendicularly to the plane of the device, as in embodiments.

Indeed, the active material 14 is in some embodiments energized S120 so as to form two or more cavities 145 (see FIGS. 3, 5, and 6). Then, in operation of the device (i.e., after configuration S110-S120), light can be coupled S130 into the resonator 12-16 so as to confine light in each of said cavities 145 (both laterally and perpendicularly to the plane (x, y)), e.g., so as to form and confine standing waves in said cavities, as depicted in FIG. 7.

Now, referring back to FIGS. 5, 6, the cavity pattern formed S120 and the light subsequently coupled S130 into the resonator may be jointly devised, so as to optically couple adjacent cavities 145. For example, an array of cavities 145 can be created, as in FIG. 3B, which cavities can be optically coupled. I.e., the resonant modes of the cavities start to mix if the inter-cavity step is on the order of less than 3 to 5 times the resonance wavelength $\lambda_{res}$. The resonance wavelengths are defined by the effective mirror distance d and the refractive index n. I.e., $\lambda_{res}=(2\,n\,d)/m$, where m is the number of the mode. In variants, however, larger spacings may be used, whereby the cavities are essentially uncoupled (i.e., yielding essentially independent resonant modes) in that case.

The active material 14 may comprise a phase change material (PCM). Examples of potential PCMs are listed below, some of which advantageously allows reversible alterations. In variants, use is made of polymer enabling trans/cis isomerization, upon suitable energization. For example, aryl azo compounds may be used, starting with azobenzene or derivatives, which enable photoisomerization of both trans/cis isomers. The isomers can be switched using distinct wavelengths of light. Ultraviolet light is used for trans-to-cis conversion, while blue light is used for cis-to-trans isomerization. Thus, regions of distinct isomers can easily be achieved in the active material 14, which have distinct physical and optical properties. Such polymers too can be switched back to reverse an initial alteration. In variants, other organic materials such as methylacrylate can be used, which produce permanent alterations upon energization thereof. Such materials allow to non-volatilely "program" the resonator but not to re-configure it, contrary to azo compounds or reversibly switchable PCMs. Yet, because of potential stability issues with the cis isomer of azo compounds, one may prefer to rely on PCMs.

PCMs generally include materials that can be switched between more than one phases, which have different optoelectronic properties. I.e., a PCM is a material having at least two reversibly switchable states, in which the PCM exhibits two different values of refractive index and/or optical absorption. Bi-stable PCMs are particularly attractive because after a phase transition has been completed it is not necessary to continuously apply power to maintain the device in its current state. Thus, in some embodiments, the active material 14 is a bi-stable PCM, which can be energized S120 so as to reversibly change optical properties thereof (i.e., its refractive index and/or optical absorption), in selected regions 145 of the PCM. After completion of step S120, the cavities 145 remain in their stable current (switched) states, even though power is not maintained, while non-altered regions are in another (unaltered) state. Note, non-altered regions include regions that were never altered so far, as well as regions that were possibly switched back S140 to their initial states, upon re-initializing a cavity, as discussed below.

Where PCM's states of distinct refractive indices are relied on, a difference of at least 0.2 (over at least part of the visible wavelength range) is in some embodiments needed for the refractive indices of the two states of the PCM. For example, one may have $n_2=2.4$ in the high refractive index state and $n_1=1.6$ in the low refractive index state. The difference of refraction indices in the two states, in some embodiments, range from 0.2 to 4, e.g., and in some embodiments preferably be between 1 and 2. For embodiments relying on a change of the optical extinction within the PCM, the optical extinction coefficients in the two states in some embodiments differs by a factor of 2 to 100, and in some embodiments preferably between 5 and 50.

Figure 4A:
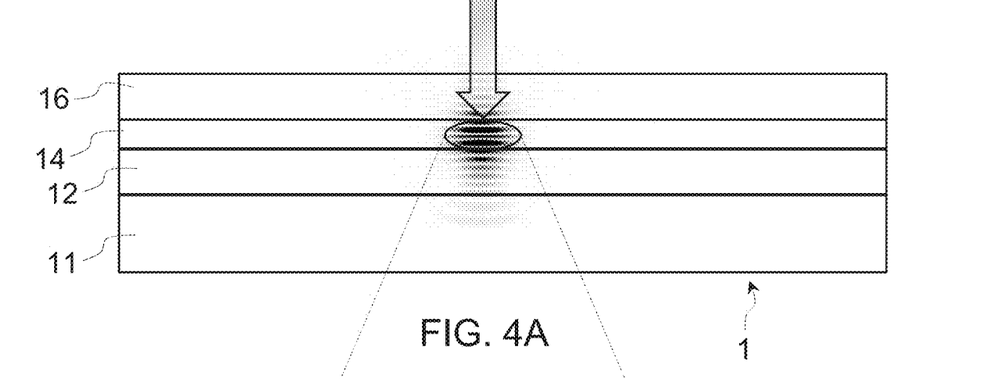
FIGS. 4A-4C illustrate how the active material of a device such as shown in FIG. 3A can be altered to create cavities having a smoothly varying refractive index profile, as involved in embodiments.
Figure 4B:
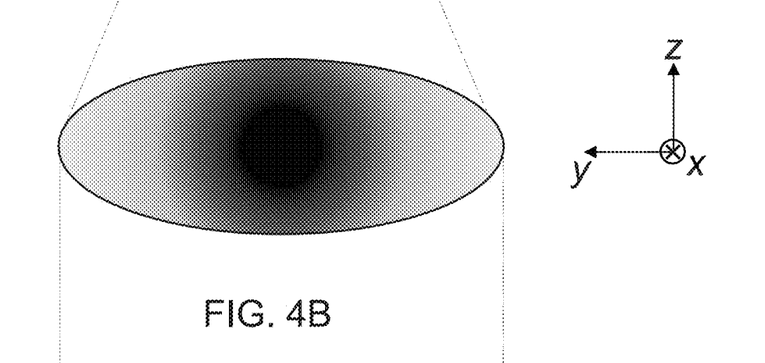
Figure 4C:
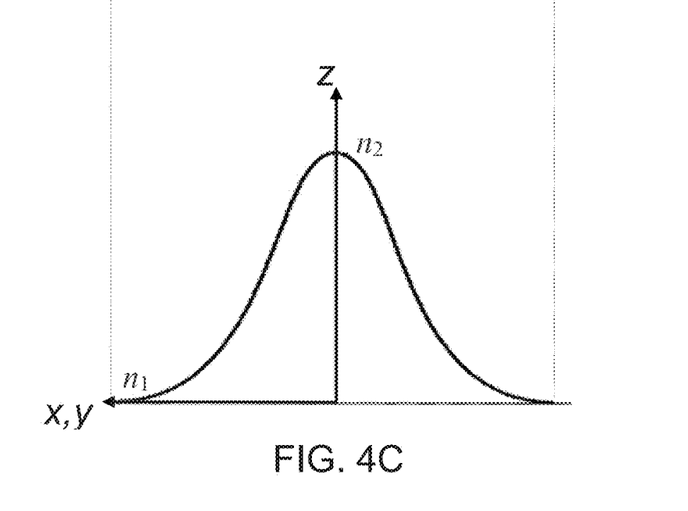

Referring to FIGS. 4A-4C, the PCM may for instance be energized S120 so as for each region 145 to have a non-constant refractive index profile, in any cross-sectional plane, e.g., (x, z) or (y, z), perpendicular to the reference plane (x, y). As illustrated in FIG. 4C, said profile may notably smoothly vary from a lower index value $n_1$ (at the periphery of a cavity) to an upper value $n_2$ (at the center of the cavity). This can be achieved by, e.g., locally heating the PCM, such that it undergoes a phase change from an amorphous to a crystalline phase or, conversely, from a crystalline to an amorphous phase, so as to laterally define resonant cavities 145. For example, the active material 14 is locally exposed to a light beam that is absorbed by the material 14 and thereby locally heats it (though resistive heating from an outer layer can be used in variants). Careful adjustment of the temporal intensity pulse envelope does not only allow switching between the so-called "SET" state ($n=n_2$) and "RESET" state ($n=n_1$) but can also provide regions with intermediate refractive index ($n_1<n<n_2$) through partial crystallization, as assumed in FIG. 4. Note, distinct temporal energy profiles are in some embodiments needed for switching the PCM back and forth between two or more switchable states, as known per se.

As a result of locally switching cavities 145, the localized cavities 145 exhibit different properties of the resonant modes frequencies, angular characteristics, spatial profile, etc. Laguerre-Gaussian modes can for instance be achieved in case of cylindrically symmetric refractive index profiles.

In embodiments, the PCM comprises a chalcogenide glass, such as GeSbTe. More generally, the PCM may for instance comprises one or more of the following compounds: GeSbTe, VOx, NbOx, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb.

As said, bi-stable PCMs (or other materials that can be switched back to their initial states) are in some embodiments used, which allow the system to be re-configured. In that respect, referring to FIG. 9, the material 14 may thus be energized S140 again and, this, so as to erase one or more of the previously formed cavities 145, e.g., to re-initialize (at least partly) the previously configured cavities 145. Using a bi-stable, reversibly switching PCM allows the device to be configured and then re-configured (i.e., reprogrammed), e.g., for a different application, for quantum simulation purposes, or, still, for acquiring a different molecular spectrum in optical filtering/spectroscopy applications. Some PCMs allow a large number of cycles, as known per se.

Interestingly, the regions 147 of the material 14 as initially energized S120 may advantageously be located vis-à-vis pre-defined cavities 146 (e.g., lithographically pre-defined cavities), as illustrated in FIG. 6. As best seen in FIG. 2B, the pre-defined cavities 146 involve a defect, according to which the effective inter-mirror distance $d_e$ ($d<d_e<d'$) differs from the average inter-mirror distance ($\sim d$) of the resonator, it being noted that the defect size ($h_0=d'-d$) is in some embodiments much smaller than the average distance $\sim d$.

Having lithographically pre-defined cavities 146 allows additional control on the cavities' parameters. For example, this makes it easier to control the cavity resonance wavelength and/or losses, as well as the coupling strength between neighboring cavities. Furthermore, the required differences between the refractive indices of the two states of the active material 14 may accordingly be significantly (up to 100 times) smaller, or conversely, the active material 14 can be made significantly (up to 100 times) thinner and thereby reduce undesired absorption.

As illustrated in FIG. 2B, the desired defect may be achieved by locally bending one or each of the mirrors 12, 16. I.e., at least one of the mirrors 12, 16 may comprise a curved interface (e.g., having a bell shape or a cusp) with the active material 14. Note, this interface has a curved profile in any plane section perpendicular to the reference plane (x, y), at the level of each pre-defined cavity 146. This may for instance be achieved by patterning a given layer of material, by locally unzipping and/or desorbing molecules of this layer (not shown), with a nano-scale dimensioned probe, to obtain a curved surface for the layer of material. Then, the layer structure may be completed (e.g., to form a DBR) by providing one or more additional layers of material in contact with the curved surface. This way, a very accurate profile may be obtained. The curved surface obtained may for instance essentially be a bi-dimensional Gaussian function.

In FIG. 2B (not to scale), the curved profile of the interface between the upper DBR 16b and layer 14 exhibit a vertex (on top of the bell-shaped profile), which defines a maximal thickness $h_0$ of the defect. The maximal thickness of the defect are, in some embodiments, less than the thickness of the (black) layer immediately above and contiguous with said vertex. Now, other types of defects may be contemplated, whereby the thickness of layer 14 may for instance be symmetrically enlarged or, on the contrary narrowed, at the level of a pre-defined cavity 146. Neighboring cavities 146 may for instance involve defects of distinct sizes and orientation.

In general, $h_0$ is in some embodiments between 1 and 100 nm, or in some embodiments 5 and 50 nm, while the characteristic length of extension (in-plane) of the defect is in some embodiments between 0.1 and 3 μm, or in some embodiments between 0.3 and 1 μm. More detail (as to possible dimensions and fabrication techniques) can be found in US2016139311 (A1). For completeness, the thickness of the active material 14 is in some embodiments preferably between 1 and 500 nm, while the thickness of the mirrors 12, 16 in some embodiments range from 20 nm (e.g., for metallic mirrors) and 5 μm (e.g., for DBR mirrors), while the individual layers of the DBR in some embodiments involve 30-500 nm thick layers of oxide material (e.g., $SiO_2$ and $Ta_2O_5$). Other materials and geometries can, however, be contemplated, as the one skilled in the art will appreciate.

As assumed in FIGS. 3-6, the active material 14 may for instance be energized S120 with a laser beam pulse directed toward the regions 145. Single laser pulses may be used to sequentially alter the regions 145, parallel or modulated beams may be used. In variants, the active material 14 (e.g., a PCM) is resistively heated, to switch the target regions 145. In all cases, the temporal and intensity profile of the pulses used can be carefully designed, jointly with the material 14 used, in order to achieve lasting (i.e., persistent alterations).

The layer 14 in some embodiments is indirectly exposed to the laser beam, e.g., via the mirror 16, which is partly permissive to the light used S120, notwithstanding its reflectivity in the spectral range of the cavity resonance. Note, additional layers may be present in the stack. Yet, such layers must, as a whole, allow the laser beam to locally heat up the material 14. Now, in variants, see FIG. 3C, the optical device 1c used may advantageously comprise an absorber layer 18, which is located opposite to the active material 14 with respect to the mirror 16 in the example of FIG. 3C. In this case, the laser beam pulse is directed to the absorber layer 18, at the level of the target regions 145. The absorber layer 18 partly converts the electromagnetic energy absorbed into heat, which is conducted (vertically) to the target regions 145. Some lateral heat losses occur, which may nevertheless be leveraged to improve the heat repartition. This notably allows a more homogeneous switching to be achieved where the active material 14 is a PCM. If necessary, the absorber layer 18 may be structured so as to define cells having low lateral thermal connections, while ensure good thermal conduction toward the active material 14, according to which the resonator is to be programmed. In all cases, the cavities 145 formed may be located at positions of cells of a regular 2-dimensional array, as assumed in FIG. 3B.

Where resistive heating is used in place of a laser beam, then a heating element and an electrically insulating (but thermally conducting) barrier shall in some embodiments be used (not shown). The heating element provides, together with the PCM 14, the switching capability. Yet, the PCM is separated from the resistively heating element by an electrically insulating barrier, which is thermally conducting.

Referring to FIGS. 1-3, and 6-8, another aspect of the invention is now described, which concerns an optical apparatus, involving a device 1, 1a-1e such as obtained through methods as discussed above (e.g., in reference to steps S110-S120 and S140 of FIG. 9). Essential aspects of this device have already been discussed; they are only briefly reminded in the following.

Figure 8A:
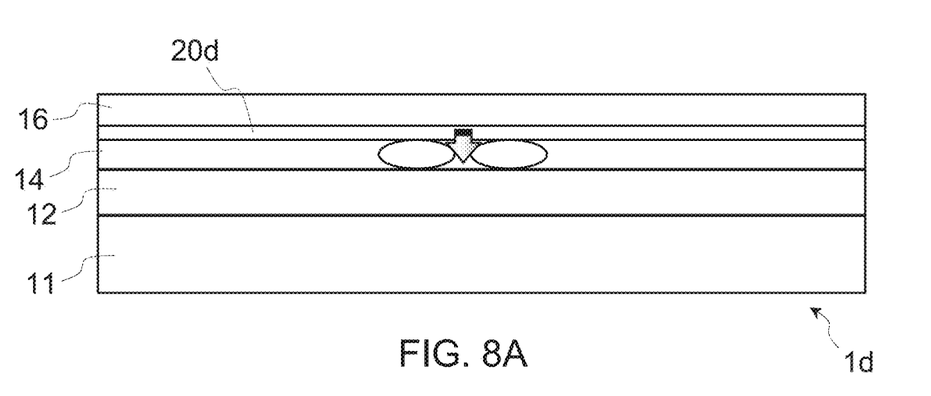
FIGS. 8A and 8B show, each, a 2-dimensional cross-sectional view of a device similar to that of FIG. 3A, which additionally comprises a light-conveying (or emitting) layer (or stack of layer) for coupling light into the resonator of the device.
Figure 8B:
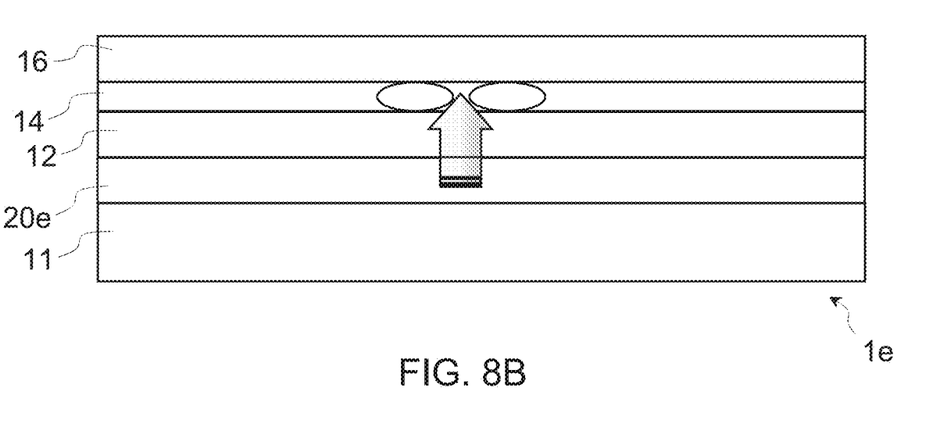

A minima, the apparatus includes two parallel mirrors 12, 16, an active material 14, and a light emitting device 20 (as explicitly shown in FIGS. 8A and 8B). The two parallel mirrors 12, 16 extend, each, parallel to a reference plane (x, y), and the active material 14 (e.g., a bi-stable PCM) extends between the mirrors 12, 16, such that the average plane of the material 14 is parallel to the reference plane (x, y), so as to form together with the mirrors 12, 16 an optical resonator.

As discussed earlier, the refractive index and/or the optical absorption is assumed to have been non-volatilely altered in regions 145 (e.g., located vis-à-vis lithographically defined cavities 146) of the material 14, so as to form respective cavities 145, in which light can potentially be laterally confined (in-plane with said average plane), in addition to being confined between the mirrors 12, 16 (perpendicularly to said reference plane). As a result, each cavity 145 has an altered mode profile compared to non-altered regions of the active material 14.

The light emitting device 20, 20d, 20e is configured to emit and couple light into the resonator, so as to confine light in each cavity 145 formed (i.e., both laterally and perpendicularly to the reference plane (x, y)). As noted earlier, the cavity dimensions and arrangement are in some embodiments devised jointly with the type of light to be coupled into the resonator. Thus, the light-emitting device may be used to couple light having an effective wavelength such as to optically couple adjacent ones of the cavities 145.

The light-emitting device may for instance comprise an active layer 20d, 20e within the cavity, i.e., having a planer configuration as the active material 14, which may form part of, e.g., a laser array or a resonant-LED array, as in FIG. 8A. In variants, an active layer 20e may be arranged below the cavity (e.g., below the bottom mirror, as in FIG. 8B), such that light is emitted towards the top, which is filtered by the programmable cavity array to emit spatially and spectrally programmed beam(s), for example. In the examples of FIG. 8A, B, the apparatus actually forms an integrated optical device. In other variants, the light source 20 may be external, as suggested in FIG. 7, and form, together with the device 1, an apparatus comprising distinct (i.e., non-integral components). More generally, several implementations may be contemplated, as the skilled person may appreciate.

The above embodiments have been succinctly described in reference to the accompanying drawings and may accommodate a number of variants. Several combinations of the above features may be contemplated. Examples are given in the next section.

2. Specific Embodiments—Technical Implementation Details

This section describes particular embodiments of an optical resonator, involving an arrangement with two mirrors and an active material in-between, whose optical properties (refractive index, absorption) can be changed non-volatilely by either optical or electrical means. By doing so, the optical resonator's properties (frequencies, positions, profiles and quality factors of the resonant modes) can be programmed. In this way, reconfigurable, complex resonator arrangements can be achieved. In contrast to laterally modulating the resonator properties through lithographic definition (e.g., using electron beams or focused ion beams), such devices have the advantage of being programmable, i.e., their properties can be changed dynamically even after manufacturing. In contrast to usual, non-volatile schemes (e.g., using liquid crystals or thermo-optic effects), the locally modified properties of the resonator persist even without maintaining the driving, resulting in larger flexibility of design and less energy consumption.

Such embodiments rely on two mirrors, e.g., DBRs 12a, 16a-b, as shown in FIG. 2, which form an optical cavity that contains the active material 14 (a PCM such as GeSbTe), allowing non-volatile changes of refractive index and/or absorption in local regions 145 thereof. In the initial state, the resonator behaves like a standard (planar) Fabry-Pérot cavity.

Resonant cavities 145 are then laterally defined by locally heating S120 the PCM such that it undergoes a phase change, which is achieved by exposing the PCM to a light beam that is absorbed by the material 14 and thereby locally heats it. Regions with intermediate refractive indices can be obtained through partial crystallization. The obtained cavities 145 have different properties of the resonant modes. By subsequent or parallel exposure to the light beam, an array of two or more cavities are created at desired positions, which can be optically coupled or uncoupled, depending on their spacing and light subsequently coupled therein. The optical cavities (and their coupling strength) can be tuned thanks to lithographically pre-defined cavities 146, as shown in FIG. 6.

In an exemplary embodiment, a 2.5 nm thick PCM (GeSbTe) layer is sputtered on a lower mirror (DBR 12$a$). The PCM layer has a refractive index $n_2$=3.5 and an extinction coefficient $k_2$=2.0 (in its amorphous phase, for a wavelength $\lambda$=500 nm). In the crystalline phase, the coefficients become $n_1$=2.0 and $k_1$=3.75 (for $\lambda$=500 nm, leading to full absorption), the overall thickness being essentially unchanged. Note, the refractive index values can be tuned by doping (n-type doping). In variants, lithographically pre-defined cavities are relied on, whose thicknesses (cavity lengths) can reach 5 nm, to locally control the cavity properties.

Some of the methods described herein can be used in the fabrication of integrated circuit chips and/or optical packages. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip can then be integrated with other chips, discrete circuit elements, and/or other signal processing devices as part of either (a) an intermediate product or (b) an end product. The end product can be any product that includes integrated circuit chips, ranging from low-end applications to advanced computer products. Optical packages may for instance use the cavities in reflection; these would allow packages that use opaque substrates but have a transparent top window/enclosure. More likely, however, optical packages would be used in a "transmission" configuration, i.e., requiring a transparent substrate plus a transparent top window.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly mentioned could be contemplated.

What is claimed is:

1. A method to configure an optical device, the method comprising:
   providing an optical device comprising two parallel mirrors extending, each, parallel to a reference plane, and an active material extending between the mirrors, whereby a plane of the active material is parallel to said reference plane, so as to form an optical resonator,
   energizing the active material to non-volatilely alter a refractive index and/or an optical absorption in one or more regions of said active material, so as to form one or more cavities, respectively, in which light can be laterally confined, in-plane with said plane, in addition to being confined between the mirrors, along a direction perpendicular to said reference plane, whereby each of the one or more cavities has an altered mode profile compared to a non-altered region of the active material,
   wherein after having energized the active material to obtain said cavities:
   energizing the active material again to erase one or more of the previously formed cavities.

2. The method according to claim 1, wherein
   the active material is energized so as to form two or more of said cavities.

3. The method according to claim 2, further comprising coupling light into the resonator so as to confine light in each of said cavities, on the one hand, between the mirrors and perpendicularly to said reference plane, and on the other hand, laterally, in-plane with said plane.

4. The method according to claim 3, wherein
   the light coupled into the resonator to optically couple adjacent ones of said cavities.

5. The method according to claim 1, wherein
   said active material comprises one of:
   a phase change material, or PCM, and
   a polymer enabling trans-cis isomerization.

6. The method according to claim 5, wherein
   said active material is a bi-stable phase change material (PCM), having at least two reversibly switchable states, in which the PCM exhibits two different values of refractive index and/or optical absorption, and
   the PCM is energized so as to reversibly change a refractive index and/or an optical absorption in said one or more regions of the PCM.

7. The method according to claim 6, wherein
   the PCM is energized so as for each region of said one or more regions to have a non-constant refractive index profile, in any cross-sectional plane perpendicular to said reference plane, said profile varying from a lower refractive index value at a periphery of said each region to an upper refractive index value at a center of said each region.

8. The method according to claim 6, wherein
   the PCM comprises a chalcogenide glass.

9. The method according to claim 8, wherein
   the PCM comprises GeSbTe.

10. The method according to claim 6, wherein the method further comprises, after having energized the PCM to obtain said cavities:
    energizing the PCM to erase one or more of the previously formed cavities, so as to re-initialize, at least partly, a refractive index and/or an optical absorption in corresponding regions of the PCM.

11. The method according to claim 1, wherein
said one or more regions are located vis-à-vis lithographically pre-defined cavities, whose effective inter-mirror distance $d_e$ differs from an average inter-mirror distance d of the resonator.

12. The method according to claim 11, wherein at least one of the mirrors comprises a curved interface with the active material, which interface has a curved profile in any plane section perpendicular to said reference plane, at a level of each of said lithographically pre-defined cavities.

13. The method according to claim 12, wherein
the optical device provided further comprises an absorber layer located opposite to said active material with respect to one of the mirrors, and
said active material is energized with a laser beam pulse directed to said absorber layer, toward said one or more regions.

14. The method according to claim 1, wherein
said active material is energized with a laser beam pulse directed toward said one or more regions.

15. An optical apparatus comprising:
two parallel mirrors extending, each, parallel to a reference plane,
an active material extending between the mirrors, whereby a plane of the active material is parallel to said reference plane, so as to form an optical resonator, and
a light emitting device,
wherein
a refractive index and/or an optical absorption is non-volatilely altered in one or more regions of said active material, so as to form one or more cavities, respectively, in which light can be laterally confined, in-plane with said plane, in addition to being confined between the mirrors, along a direction perpendicular to said reference plane, whereby each of the one or more cavities has an altered mode profile compared to a non-altered region of the active material, and
the light-emitting device is configured to couple light into the resonator, so as to confine light in each of said cavities, on the one hand, between the mirrors and perpendicularly to said reference plane, and on the other hand, laterally, in-plane with said plane,
the active material having capacity to be energized, which energizing erases one or more of previously formed cavities.

16. The optical apparatus according to claim 15, wherein
the light-emitting device is further configured to couple light having an effective wavelength to optically couple adjacent ones of the cavities.

17. The optical apparatus according to claim 15, wherein
said active material is a bi-stable phase change material (PCM), having at least two reversibly switchable states, in which the PCM exhibits two different values of refractive index and/or optical absorption, and
the refractive index and/or the optical absorption of the PCM is reversibly changed in said one or more regions of the PCM, so as to differ from the refractive index and/or the optical absorption in non-altered regions of the PCM.

18. The optical apparatus according to claim 17, wherein
the refractive index and/or the optical absorption of the PCM is reversibly changed in said one or more regions so as for each of said one or more regions to have a non-constant refractive index profile, in any cross-sectional plane perpendicular to said reference plane, said profile varying from a lower refractive index value at a periphery to a lower refractive index value at a center of said each of said one or more regions.

19. The optical apparatus according to claim 15, wherein
said one or more regions of the active material are located vis-à-vis lithographically defined cavities, whose effective inter-mirror distance $d_e$ differs from an average inter-mirror distance d of the optical resonator.

20. The optical apparatus according to claim 19, wherein
at least one of the mirrors comprises a curved interface with the active material, which interface has a curved profile in any plane section perpendicular to said reference plane, at a level of each of said vis-à-vis lithographically pre-defined cavities.

* * * * *